United States Patent
Schnell et al.

(10) Patent No.: US 10,364,335 B2
(45) Date of Patent: Jul. 30, 2019

(54) RUBBER COMPOSITION CONTAINING A HIGHLY SATURATED DIENE ELASTOMER

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Benoit Schnell, Clermont-Ferrand (FR); Julien Thuilliez, Clermont-Ferrand (FR); Julien Cladiere, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE, S.A, Granges-Paccot (CH)

( * ) Notice: Subject to any disclaimer, the term of this patent is extended or adjusted under 35 U.S.C. 154(b) by 134 days.

(21) Appl. No.: 14/648,481

(22) PCT Filed: Nov. 21, 2013

(86) PCT No.: PCT/EP2013/074393
§ 371 (c)(1),
(2) Date: May 29, 2015

(87) PCT Pub. No.: WO2014/082919
PCT Pub. Date: Jun. 5, 2014

(65) Prior Publication Data
US 2015/0315356 A1    Nov. 5, 2015

(30) Foreign Application Priority Data
Nov. 29, 2012  (FR) ....................... 12 61383

(51) Int. Cl.
*C08F 236/06*    (2006.01)
*C08F 236/10*    (2006.01)
(Continued)

(52) U.S. Cl.
CPC .............. *C08K 3/36* (2013.01); *B60C 1/0016* (2013.04); *C08C 19/02* (2013.01); *C08K 3/04* (2013.01);
(Continued)

(58) Field of Classification Search
CPC ........ C08F 236/06; C08F 236/10; C08K 3/04; C08K 3/36
(Continued)

(56) References Cited
U.S. PATENT DOCUMENTS 5,017,660 A  *  5/1991  Hattori ................. C08C 19/02
                                                        524/576
5,334,566 A       8/1994  Gibler et al.
(Continued)

FOREIGN PATENT DOCUMENTS

EP    0889057    1/1999
EP    1605000    12/2005
(Continued)

OTHER PUBLICATIONS

Translation to JP 2000053706 (2000).*
(Continued)

*Primary Examiner* — Kelechi Egwim
(74) *Attorney, Agent, or Firm* — Dickinson Wright PLLC (57) ABSTRACT

A rubber composition based on a reinforcing filler and on an elastomeric matrix comprising a highly saturated diene elastomer, comprising units of the following categories A, B, C, D and E, or units of these same categories A, B, C, D and E comprising, for at least one of the categories B, C, D and E, a mixture of at least two different units of the same category which differ from one another through the nature of their side groups Ri:

A)
$$-CH_2-CH_2-$$
at a molar fraction of m %

B)
$$-CH-\underset{R3}{\underset{|}{C}}=\underset{R4}{\underset{|}{C}}-CH-$$
with R1, R2 on the left carbons and R3, R4 on the right carbons
at a molar fraction of n %

C)
$$-CH-\underset{R3-CH}{\underset{|}{C}}-$$
with R1, R2 substituents, and $CH-R4$ below
at a molar fraction of o %

D)
$$-CH-\underset{R3-CH}{\underset{|}{C}}-$$
with R1, R2 substituents, and $CH_2-R4$ below
at a molar fraction of p %

E)
$$-CH-CH-$$
with R5, R6 substituents
at a molar fraction of q % where
$m/p \geq 1.75$
$m \geq 20$
$n+o \geq 10$
$o+p \leq 30$ (Continued)

and where R1, R2, R3 and R4, which are identical or different, denote a hydrogen atom, a methyl radical or a phenyl radical which is substituted or unsubstituted in the ortho, meta or para position by a methyl radical; R5 denotes a hydrogen atom or a methyl radical; R6 denotes a methyl radical or a phenyl radical which is substituted or unsubstituted in the ortho, meta or para position by a methyl radical; m, n, o, p and q are numbers ranging from 0 to 100.

This rubber composition enables a satisfactory degree of stiffness to be achieved while maintaining acceptable hysteresis properties, or even improving them, for use in the manufacture of tires for motor vehicles.

18 Claims, 2 Drawing Sheets (51) Int. Cl.
*C08K 3/04* (2006.01)
*C08K 3/36* (2006.01)
*C08C 19/02* (2006.01)
*B60C 1/00* (2006.01)
*C08L 15/00* (2006.01)
*C08L 7/00* (2006.01)
*C08L 9/00* (2006.01)
*C08L 61/04* (2006.01)
*C08L 91/00* (2006.01)
*C08L 93/00* (2006.01)

(52) U.S. Cl.
CPC .................. *C08L 7/00* (2013.01); *C08L 9/00* (2013.01); *C08L 15/00* (2013.01); *C08L 61/04* (2013.01); *C08L 91/00* (2013.01); *C08L 93/00* (2013.01); *C08F 236/06* (2013.01); *C08F 236/10* (2013.01)

(58) Field of Classification Search
USPC .................................................. 524/574, 575
See application file for complete search history.

(56) References Cited

U.S. PATENT DOCUMENTS

| 5,804,644 | A | * | 9/1998 | Nakafutami | B60C 1/00 |
|---|---|---|---|---|---|
| | | | | | 152/450 |
| 5,886,108 | A | | 3/1999 | Miyamoto | |
| 6,610,261 | B1 | | 8/2003 | Custodero et al. | |
| 6,747,087 | B2 | | 6/2004 | Custodero et al. | |
| 2002/0107423 | A1 | | 8/2002 | Miyamoto | |
| 2006/0287449 | A1 | | 12/2006 | Miyamoto | |
| 2008/0146733 | A1 | * | 6/2008 | Tsai | B01J 31/0259 |
| | | | | | 525/55 |

FOREIGN PATENT DOCUMENTS

| FR | 2900352 | | 11/2007 |
|---|---|---|---|
| JP | 08-120119 A | | 5/1996 |
| JP | 08120119 A | * | 5/1996 |
| JP | 2000-053706 A | | 2/2000 |
| JP | 2000053706 A | * | 2/2000 |
| JP | 2001270913 | | 10/2001 |
| JP | 3439767 B2 | | 8/2003 |
| WO | 9928380 A1 | | 6/1996 |
| WO | 9637547 A2 | | 11/1996 |
| WO | 0210269 A2 | | 2/2002 |
| WO | 2005087859 A1 | | 9/2005 |
| WO | 2006061064 A1 | | 6/2006 |
| WO | 2006069792 A1 | | 7/2006 |
| WO | 2006069793 A1 | | 7/2006 |
| WO | 2007017060 A1 | | 2/2007 |
| WO | 2008003434 A1 | | 1/2008 |
| WO | 2008003435 A1 | | 1/2008 |

OTHER PUBLICATIONS

Database WPI Week 200218, Thomson Scientific, London, GB; AN 2002-134029 XP-002698579, & JP 2001 270913 A (ASAHI KASEI KK) Oct. 2, 2001 (Oct. 2, 2001) abstract.
The Handbook of Homogeneous Hydrogenation; Editors Johannes G. deVries, Cornelis J. Elsevier, Wiley 2008, Chapter 19, Homogeneous Catalytic Hydrogenation of Polymers, by Garry L. Rempel, Qinmin Pan, and Jialong Wu.

* cited by examiner

RUBBER COMPOSITION CONTAINING A HIGHLY SATURATED DIENE ELASTOMER

This application is a 371 national phase entry of PCT/EP2013/074393, filed 21 Nov. 2013, which claims benefit of French Patent Application No. 1261383, filed 29 Nov. 2012, the entire contents of which are incorporated herein by reference for all purposes.

BACKGROUND

Field

The present disclosure relates to a reinforced rubber composition based on an elastomeric matrix comprising a highly saturated diene elastomer and also to a semi-finished article comprising such a composition and to a tire incorporating such a semi-finished article.

Description of Related Art

Since saving fuel and the need to protect the environment have become priorities, it is desirable to produce mixtures which have good wear resistance properties while having a hysteresis which is as low as possible, so as to be able to process them in the form of rubber compositions which can be used to manufacture various semi-finished products used in making a tire, such as for example treads, in order to obtain tires which have improved wear resistance without adversely affecting rolling resistance.

Ideally, for example, a tire tread must fulfil a great many technical requirements, which are often contradictory in nature, including increased wear resistance while still affording the tire low rolling resistance, and enhanced grip both on dry ground and on wet, snowy or icy ground.

It is known that to improve wear resistance a certain stiffness of the tread is desirable, which may be obtained for example by increasing the content of reinforcing filler or by incorporating certain reinforcing resins into the rubber compositions making up these treads.

Unfortunately, experience has shown that such stiffening of the tread adversely affects rolling resistance properties, in a known way and often prohibitively so, since it is accompanied by significantly increased hysteresis losses of the rubber composition. Consequently, improving stiffness performance while maintaining low rolling resistance is a constant concern for tire designers.

There is therefore a permanent need to provide a rubber composition which enables tires with improved wear resistance to be obtained without adversely affecting rolling resistance.

In light of the above, it is a general aim to provide rubber compositions which allow a compromise to be reached between the stiffness and hysteresis properties that is acceptable for use in tires.

SUMMARY

This aim is achieved by virtue of the fact that the inventors have developed a rubber composition for tires which enables a satisfactory degree of stiffness to be reached while maintaining or even improving acceptable hysteresis properties.

Thus, a subject of the invention is a rubber composition for tires comprising a reinforcing filler and an elastomeric matrix based on a highly saturated elastomer, which allows a significantly improved compromise to be reached between stiffness and hysteresis properties.

Another subject of the invention is a process for preparing such a rubber composition for tires.

Another subject of the invention is a semi-finished article comprising such a rubber composition.

A subject of the invention is also a tire incorporating such a semi-finished article.

DETAILED DESCRIPTION OF SPECIFIC EMBODIMENTS

In the present description, unless expressly indicated otherwise, all percentages (%) given are % by weight. Moreover, any range of values denoted by the expression "between a and b" represents the range of values from more than a to less than b, (i.e. excluding the limit values a and b) whereas any range of values denoted by the expression "from a to b" means the range of values from a to b (i.e. including the strict limit values a and b).

The expression "composition based on" is understood to mean a composition comprising the reaction mixture and/or the reaction product of the various constituents used, some of these base constituents being able to, or intended to, react with one another at least in part during the different phases of manufacture of the composition, in particular during the crosslinking or vulcanization thereof.

A first subject of the invention is a rubber composition based on a reinforcing filler and on an elastomeric matrix comprising at least one highly saturated diene elastomer, characterized in that the highly saturated elastomer comprises, distributed randomly within the elastomer, units of the following categories A, B, C, D and E, or units of these same categories A, B, C, D and E comprising, for at least one of the categories B, C, D and E, a mixture of at least two different units of the same category which differ from one another through the nature of their side groups Ri:

A)

at a molar fraction of m %

B)

at a molar fraction of n %

C)

at a molar fraction of o %

D)

at a molar fraction of p %

E)

at a molar fraction of q % where
R1, R2, R3 and R4, which are identical or different, denote a hydrogen atom, a methyl radical or a phenyl radical which is substituted or unsubstituted in the ortho, meta or para position by a methyl radical,
R5 denotes a hydrogen atom or a methyl radical,
R6 denotes a methyl radical or a phenyl radical which is substituted or unsubstituted in the ortho, meta or para position by a methyl radical,
m, n, o, p and q are numbers ranging from 0 to 100;
the molar fraction of each unit being defined in relation to the whole of the elastomer,
and in that the highly saturated elastomer has the following properties:
$m/p \geq 1.75$
$m \geq 20$
$n+o \geq 10$
$o+p \leq 30$

Preferably, the molar ratios of each of the units of the highly saturated elastomer are such that the elastomer also has the following properties:
$m \geq 50$ and
$o+p \leq 15$ According to one preferred aspect, in combination with the preceding preferred aspect or taken alone, the highly saturated elastomer is such that $o=0$.

According to a variant of the invention, the highly saturated elastomer consists solely of units chosen from the categories A, B, C, D and E at their respective molar ratios.

According to another variant of the invention, the highly saturated elastomer comprises, in addition to the units chosen from the categories A, B, C, D and E, units of category F derived exclusively from non-diene monomers, at a molar ratio of less than 40%, particularly less than 30%, or even less than 20%, in relation to the whole of the elastomer:

F)

with φ denoting a phenyl radical which is substituted or unsubstituted in the ortho, meta or para position by a methyl radical; φ preferably denotes a phenyl radical.

It is understood that this highly saturated diene elastomer may consist of a mixture of highly saturated diene elastomers which differ from one another in terms of their microstructures or macrostructures.

According to these two variants, one particular embodiment of the invention provides for the highly saturated elastomer to be such that R1, R2, R3 and R4 are identical and denote a hydrogen atom, and for q to be equal to 0.

According to these two variants, another particular embodiment of the invention provides for the highly saturated elastomer to be such that
for the unit B, R1, R3 and R4 are identical and denote a hydrogen atom and R2 denotes a methyl radical,
for the unit C, the latter consists of a mixture of two units C, denoted C1 and C2, which differ in terms of the nature of R2 and R3, the groups R1 and R4 being identical and denoting a hydrogen atom, where
for C1, R2 denotes a methyl radical and R3 denotes a hydrogen atom,
for C2, R2 denotes a hydrogen atom and R3 denotes a methyl radical,
for the unit D, the latter consists of a mixture of two units D, denoted D1 and D2, which differ in terms of the nature of R2 and R3, the groups R1 and R4 being identical and denoting a hydrogen atom,
for D1, R2 denotes a methyl radical and R3 denotes a hydrogen atom,
for D2, R2 denotes a hydrogen atom and R3 denotes a methyl radical, and
q is equal to 0.

According to these two variants, yet another particular embodiment of the invention provides for the highly saturated elastomer to be such that
for the unit B, the latter consists of a mixture of two units B, denoted B1 and B2, which differ in terms of the nature of R2, the groups R1, R3 and R4 being identical and denoting a hydrogen atom, where
for B1, R2 denotes a hydrogen atom,
for B2, R2 denotes a methyl radical,
for the unit C, the latter consists of a mixture of three units C, denoted C1, C2 and C3, which differ in terms of the nature of R2 and R3, R1 and R4 being identical and denoting a hydrogen atom, where
for C1, R2 denotes a methyl radical and R3 denotes a hydrogen atom,
for C2, R2 denotes a hydrogen atom and R3 denotes a methyl radical,
for C3, R2 and R3, which are identical, denote a hydrogen atom
for the unit D, the latter consists of a mixture of three units D, denoted D1, D2 and D3, which differ in terms of the nature of R2 and R3, the groups R1 and R4 being identical and denoting a hydrogen atom, where
for D1, R2 denotes a methyl radical and R3 denotes a hydrogen atom,
for D2, R2 denotes a hydrogen atom and R3 denotes a methyl radical,
for D3, R2 and R3, which are identical, denote a hydrogen atom, and
q is equal to 0.

According to an embodiment of the invention, the highly saturated diene elastomer has a number-average molar mass of at least 90 000 g/mol and at most 1 500 000 g/mol. The polydispersity index PDI, equal to $M_w/M_n$ (ratio of weight-average molar mass to number-average molar mass), is between 1 and 3.

The highly saturated elastomer may be obtained according to various synthesis methods known to those skilled in the art, notably as a function of the targeted values of m, n, o, p and q.

According to one synthesis method, the highly saturated elastomer is obtained by hydrogenation of a diene elastomer.

The diene elastomer to be hydrogenated is then understood as any homopolymer of a conjugated diene monomer chosen from 1,3-butadiene, 2-methyl-1,3-butadiene, an aryl-1,3-butadiene, 1,3-pentadiene, or any copolymer obtained by copolymerization of the preceding conjugated dienes with one another or with 2,3-dimethyl-1,3-butadiene or 2,4-hexadiene, or with one or more "vinyl aromatic" compounds having 8 or 9 carbon atoms. In the latter case of copolymers, these contain at least 60 mol % of diene units and at most 40 mol % of vinyl aromatic units.

By way of vinyl aromatic monomer, styrene or styrene substituted in the ortho, meta or para position by a methyl radical is particularly suitable.

Preferably, the diene elastomer is selected from the group consisting of polybutadienes (BRs), natural rubber (NR), synthetic polyisoprenes (IRs), butadiene copolymers, isoprene copolymers and mixtures of these elastomers. The butadiene copolymers and the isoprene copolymers are more preferably selected from the group consisting of styrene-butadiene (SBR) copolymers, butadiene-isoprene (BIR) copolymers, styrene-isoprene (SIR) copolymers and styrene-butadiene-isoprene (SBIR) copolymers.

The elastomer may be prepared in emulsion or solution. The polymerization conditions used, notably the presence or absence of a modifying and/or randomizing agent, and the quantities of modifying and/or randomizing agent used, enable the synthesis of the elastomer according to a well-defined microstructure with a view to obtaining the targeted values of m, n, o, p and q. The choice of these agents and the quantities thereof is within the scope of those skilled in the art.

Hydrogenation of the diene elastomer is carried out according to any method known to those skilled in the art. By way of example, reference may be made to the hydrogenation methods described in "The Handbook of Homogeneous Hydrogenation", Editors Johannes G. de Vries, Cornelis J. Elsevier—WILEY 2008—Chapter 19—Homogeneous Catalytic Hydrogenation of Polymers, by Garry L. Rempel, Qinmin Pan, and Jialong Wu.

The highly saturated elastomer is notably obtained by carrying out partial hydrogenation of an unsaturated diene elastomer according to methods well known to those skilled in the art. The polymer to be hydrogenated is dissolved in an inert hydrocarbon-based solvent, such as cyclohexane, methylcyclohexane or hexane, in the absence of oxygen and moisture. Hydrogenation of the unsaturated diene elastomer is carried out according to a mode of operation known to those skilled in the art, for example as described in patent application U.S. Pat. No. 5,334,566 from Shell Oil Company. To this end, the solution is purified by eliminating volatile impurities by nitrogen bubbling and is then heated to a temperature. An organic alkali metal compound, preferably an organolithium compound of the alkyllithium type for example, is added to the solution. The nitrogen is then degassed and hydrogen is introduced under pressure. The mixture is stirred and the temperature stabilized in the range from 0° C. to 120° C., preferably from 60° C. to 90° C.

At this stage, a Tebbe-type reagent in solution in an inert hydrocarbon-based solvent preferably identical to that used for the elastomer and prepared according to a mode of operation known to those skilled in the art, for example as described in patent application U.S. Pat. No. 5,886,108 from Asahi, is added so as to generate the hydrogenation catalyst in situ by reacting the Ti—Al reagent with the alkali metal hydride present in the reaction medium. The hydrogen pressure is maintained in a range of 0.05 bar to 83 bar. The concentration of catalyst varies in a range from 0.01 mmol per 100 g of elastomer to 20 mmol per 100 g of elastomer.

Hydrogen consumption is monitored over time. When the targeted amount has been reached, which amount is linked to the targeted degree of hydrogenation, the supply of hydrogen is stopped and the medium is deactivated by degassing and adding a solution of diluted ethanol to the inert hydrocarbon-based solvent. The resulting partially hydrogenated diene polymer solution is evacuated, the polymer is recovered by a stripping stage, and then by drying. The duration of hydrogenation generally varies from 30 to 360 minutes.

Those skilled in the art will know how to adjust the hydrogenation conditions, notably the molar ratio of alkali metal to titanium, the temperature, the pressure and the duration, in order to obtain the targeted microstructural properties, as defined above, of the highly saturated elastomer of the invention.

According to one variant, the rubber composition in accordance with the invention comprises the highly saturated diene elastomer as sole constituent of the elastomeric matrix.

According to another variant, the rubber composition in accordance with the invention may also comprise at least one other diene elastomer. According to this variant, this other elastomer is present in proportions of at most 60 phr (parts by weight per hundred parts of total elastomer), preferably at most 45 phr. Moreover, this elastomer is preferably present in proportions of at least 5 phr.

According to this variant, this other diene elastomer may be any homopolymer obtained by polymerization of a conjugated diene monomer having 4 to 12 carbon atoms, or any copolymer obtained by copolymerization of one or more conjugated dienes with one another or with one or more vinyl aromatic compounds having from 8 to 20 carbon atoms. In the case of a copolymer, it contains from 20 to 99% by weight of diene units and from 1 to 80% by weight of vinyl aromatic units.

By way of conjugated dienes, the following are notably suitable: 1,3-butadiene, 2-methyl-1,3-butadiene, 2,3-di(C1-C5 alkyl)-1,3-butadienes such as for example 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene, 2,4-hexadiene. By way of vinyl aromatic compounds, the following are suitable for example: styrene, ortho-, meta-, or para-methylstyrene, the commercially sold mixture "vinyl toluene", para-tert-butyl-styrene, methoxystyrenes, chlorostyrenes, vinylmesitylene, divinylbenzene, vinylnaphthalene.

This other diene elastomer may have any microstructure. It may be a block, random, sequential or microsequential elastomer, and may be prepared in emulsion or solution. It may be coupled and/or star branched, or else functionalized with a coupling and/or star-branching or functionalizing agent.

Preferably, this other diene elastomer used in the invention is selected from the group of highly unsaturated diene elastomers consisting of polybutadienes (BRs), synthetic polyisoprenes (IRs), natural rubber (NR), butadiene copolymers, isoprene copolymers and mixtures of these elastomers. Such copolymers are more preferably selected from the group consisting of styrene-butadiene (SBR) copolymers, butadiene-isoprene (BIR) copolymers, styrene-isoprene (SIR) copolymers and styrene-butadiene-isoprene (SBIR) copolymers.

It is understood that this other diene elastomer may consist of a mixture of diene elastomers which differ from one another in terms of their microstructures, their macrostructures or by the presence of a function, by the nature or position of said function in the elastomer chain.

The rubber composition in accordance with the invention has the other essential feature of comprising a reinforcing filler, for example carbon black, an inorganic reinforcing filler such as silica, to which a coupling agent is added in a known way, or else a mixture of these two types of filler.

According to a variant of the invention, the reinforcing filler predominantly consists of carbon black, i.e. it comprises at least 50% carbon black by weight of the total weight of the filler.

According to this variant, the reinforcing filler may consist of 100% by weight of carbon black. If the reinforcing filler comprises less than 100% by weight of carbon black, the remainder of filler is provided by at least one other reinforcing filler, notably silica.

According to another variant of the invention, the reinforcing filler is predominantly something other than carbon black, i.e. it comprises more than 50% by weight, relative to the total weight of filler, of one or more fillers other than carbon black, notably an inorganic reinforcing filler such as silica, or even it exclusively consists of such a filler.

According to this other variant, when carbon black is also present, it may be used at an amount of lower than 20 phr, more preferably lower than 10 phr (for example between 0.5 and 20 phr, notably between 2 and 10 phr). In the ranges indicated, benefit can be gained from the colouring (black pigmenting agent) and UV-stabilizing properties of carbon blacks.

Preferably, the amount of total reinforcing filler (carbon black and/or other reinforcing filler such as silica) is between 10 and 200 phr, more preferably between 30 and 150 phr, the optimum amount being different according to the specific targeted applications, as is known.

All carbon blacks, used individually or in the form of mixtures, are suitable as carbon blacks, notably the blacks conventionally used in tires or their treads ("tire grade" blacks). Among the latter, mention will more particularly be made of the reinforcing carbon blacks of the series 100, 200, 300, or the carbon blacks of the series 500, 600 or 700 (ASTM grades), such as for example the carbon blacks N115, N134, N234, N326, N330, N339, N347, N375, N550, N683, N772. These carbon blacks may be used on their own, as available commercially, or in any other form, for example as support for some of the rubber-making additives used.

Any other inorganic or mineral filler, irrespective of colour or origin (natural or synthetic), which is able to reinforce a rubber composition intended for manufacturing tires, on its own, with no means other than an intermediate coupling agent, is to be understood here as an inorganic reinforcing filler other than carbon black; such a filler is generally characterized, in a known way, by the presence of hydroxyl groups (—OH) at its surface.

Mineral fillers of the siliceous type, preferably silica ($SiO_2$) are notably suitable as inorganic reinforcing fillers other than carbon black. The silica used may be any reinforcing silica known to those skilled in the art, notably any precipitated or fumed silica having a BET surface area and a CTAB specific surface area both lower than 450 $m^2/g$, preferably from 30 to 400 $m^2/g$, notably between 60 and 300 $m^2/g$. Mention will also be made of the alumina-type mineral fillers, in particular alumina ($Al_2O_3$) or aluminium (oxide) hydroxides, or else reinforcing titanium oxides, for example described in U.S. Pat. No. 6,610,261 and U.S. Pat. No. 6,747,087. Reinforcing fillers of another nature, notably carbon black, are also suitable as reinforcing fillers, as long as these reinforcing fillers would be covered with a siliceous layer, or else would have functional sites, notably hydroxyl sites, at the surface thereof, entailing the use of a coupling agent in order to establish the bond between the filler and the elastomer. By way of example, mention may be made for example of carbon blacks for tires as described for example in the patent documents WO 96/37547 and WO 99/28380.

The physical state in which the inorganic reinforcing filler is present is of no concern, whether it is in the form of powder, microbeads, granules or else beads. Of course, mixtures of different reinforcing fillers, in particular highly dispersible silicas as described above, are also understood as inorganic reinforcing fillers.

When the reinforcing filler comprises a filler which entails the use of a coupling agent in order to establish the bond between the filler and the elastomer, the rubber composition according to the invention also conventionally comprises an agent able to reliably ensure said bond. When silica is present in the composition as reinforcing filler, organosilanes, notably alkoxysilane polysulphides or mercaptosilanes, or else at least bifunctional polyorganosiloxanes, may be used as coupling agents. Silica/elastomer bonding agents have notably been described in a great many documents, with the most well known being bifunctional alkoxysilanes such as alkoxysilane polysulphides.

In the compositions in accordance with an embodiment of the invention, the amount of coupling agent is advantageously lower than 20 phr, it being understood that it is generally desirable to use as little as possible thereof. The amount thereof is preferably between 0.5 and 12 phr. The presence of the coupling agent depends on the presence of the inorganic reinforcing filler other than carbon black. The amount thereof is readily adjusted by those skilled in the art depending on the amount of said filler; it is typically of the order of 0.5% to 15% by weight relative to the amount of inorganic reinforcing filler other than carbon black.

The rubber compositions in accordance with an embodiment of the invention may also contain, as a complement to the coupling agents, coupling activators, filler-covering agents, or more generally processing aids which, in a known way, by virtue of improved dispersion of the filler within the rubber matrix and lowering of the viscosity of the compositions, are able to improve the ease with which they are processed in the uncured state; these agents being, for example, hydrolysable silanes such as alkylalkoxysilanes, polyols, polyethers, primary, secondary or tertiary amines, or hydroxylated or hydrolysable polyorganosiloxanes.

The rubber compositions in accordance with an embodiment of the invention may also contain organic reinforcing fillers which may replace all or some of the carbon blacks or the other inorganic reinforcing fillers described above. As examples of organic reinforcing fillers mention may be made of functionalized polyvinyl organic fillers as described in applications WO-A-2006/069792, WO-A-2006/069793, WO-A-2008/003434 and WO-A-2008/003435.

The rubber compositions in accordance with an embodiment of the invention may also comprise all or some of the additives customarily used in elastomer compositions intended for the manufacture of tires, such as for example pigments, protection agents such as anti-ozone waxes, chemical antiozonants, antioxidants, antifatigue agents, reinforcing or plasticizing resins, methylene acceptors (for example phenol novolac resin) or methylene donors (for example HMT or H3M) as described for example in application WO 02/10269, a crosslinking system based either on sulphur or on donors of sulphur and/or peroxides and/or bismaleimides, vulcanization accelerators, vulcanization activators, adhesion promoters such as cobalt-based compounds, plasticizing agents, preferably non-aromatic or only slightly aromatic, selected from the group consisting of naphthenic oils, paraffinic oils, MES oils, TDAE oils, ether plasticizers, ester plasticizers, hydrocarbon-based resins having a high $T_g$, preferably greater than 30° C., as described for example in applications WO 2005/087859, WO 2006/061064 and WO 2007/017060, and mixtures of such compounds.

A subject of the invention is also a process for preparing a rubber composition as described previously.

The composition is manufactured in suitable mixers, using two successive preparation phases well known to those skilled in the art: a first phase of thermomechanical working or kneading (termed a "non-productive" phase) at high temperature, up to a maximum temperature of between 110° C. and 190° C., preferably between 130° C. and 180° C., followed by a second phase of mechanical working (termed a "productive" phase) up to a lower temperature, typically lower than 110° C., for example between 40° C. and 100° C., during which finishing phase the crosslinking system is incorporated.

The process in accordance with an embodiment of the invention for preparing a rubber composition according to the invention comprises at least the following steps:

carrying out, at a maximum temperature of between 130° C. and 200° C., preferably between 145° C. and 185° C., a first step of thermomechanical working (sometimes termed a "non-productive" phase) of the base constituents needed for the rubber composition, with the exception of the crosslinking system and if applicable an adhesion promoter, by intimately incorporating, by kneading in one or several stages, composition ingredients into the elastomeric matrix comprising the highly saturated elastomer, then carrying out, at a temperature lower than said maximum temperature of said first step, preferably lower than 120° C., a second step of mechanical working during which said crosslinking system and if applicable an adhesion promoter is incorporated.

According to variants of the invention, the process for preparing the rubber composition comprises the step of preparing the highly saturated elastomer as described above according to the various synthesis methods thereof.

The finished composition thus obtained can then be calendered, for example in the form of a sheet or a plate or else can be extruded, for example so as to form a rubber profiled element which can be used as a semi-finished rubber product intended for the tire.

Another subject of the invention is a semi-finished rubber product comprising a reinforced rubber composition according to the invention.

Another subject of the invention is a tire, at least one of the constituent elements of which is a semi-finished rubber product comprising a reinforced rubber composition according to an embodiment of the invention.

By virtue of the improved stiffness which characterizes a reinforced rubber composition according to an embodiment of the invention, without deterioration of the hysteresis properties, it will be noted that a tire, the tread of which comprises the composition, has an advantageously enhanced wear resistance without adversely affecting the rolling resistance.

The aforementioned features of the present invention, as well as others, will be better understood on reading the following description of several exemplary embodiments of the invention, given by way of non-limiting illustration.

Measurements and Tests Used

The rubber compositions are characterized after curing, as indicated below.

a) Mechanical Properties

Tensile Tests

These tensile tests make it possible to determine the elasticity stresses and the properties at break. Unless otherwise indicated, they are carried out in accordance with French standard NF T 46-002 of September 1988. The nominal secant modulus (or apparent stress, in MPa) at 10% elongation (denoted MA10) and 100% elongation (MA100) are measured in second elongation (i.e., after an accommodation cycle at the level of extension provided for the measurement itself). The tensile measurements to determine the accommodated secant moduli are carried out either at a temperature of 23° C.+/−2° C., or at a temperature of 60° C.+/−2° C., and under standard hygrometry conditions (50+/−5% relative humidity). These values represent the stiffness: the greater the value of the moduli, the greater the stiffness.

b) Dynamic Properties

The dynamic properties $G^*$ and tan $\delta_{max}$ are measured on a viscosity analyser (Metravib VA4000) according to the standard ASTM D 5992-96. The response of a sample of vulcanized composition (cylindrical test specimen with a thickness of 4 mm and with a cross section of 400 mm²), subjected to a simple alternating sinusoidal shear stress, at a frequency of 10 Hz, is recorded under standard temperature conditions (23° C.) according to the standard ASTM D 1349-99, or, depending on the case, at a different temperature; in particular in the first example cited the measurement temperature is 60° C. A strain amplitude sweep is carried out from 0.1% to 100% peak to peak (forward cycle), then from 100% to 0.1% peak to peak (return cycle). The results made use of are the complex dynamic shear modulus ($G^*$) and the loss factor tan δ. For the return cycle, the maximum value of tan δ observed, denoted by tan $\delta_{max}$, is indicated. This value represents the hysteresis of the material and in the present case the rolling resistance: the lower the value of tan $\delta_{max}$, the lower the rolling resistance. The values of $G^*$ measured at 23° C. or 60° C. represent the stiffness; that is to say the resistance to strain: the higher the value of $G^*$, the greater the stiffness of the material and therefore the greater the wear resistance.

Example 1

The tests which follow demonstrate the improved stiffness of the rubber compositions according to an embodiment of the invention, while maintaining the same degree of hysteresis and hence of rolling resistance, or even with improved hysteresis, by lowering the value thereof in comparison to the control compositions. The compositions tested, for which the reinforcing filler is carbon black, may very particularly constitute a tread.

The Elastomers

Elastomers P1, P2 and P3 will be obtained by hydrogenation from a diene elastomer, to be more precise the control diene elastomer 1.

Elastomer P is an SBR made up in the following way: 15% styrene units, 20% 1,2-butadiene units and 65% 1,4-butadiene units ($T_g$=−49° C.).

Elastomer Q is an SBR made up in the following way: 19% styrene units, 4% 1,2-butadiene units and 77% 1,4-butadiene units ($T_g$=−55° C.).

Elastomer P1 is obtained by hydrogenation of 41% of the double bonds in elastomer P.

Elastomer P2 is obtained by hydrogenation of 65% of the double bonds in elastomer P.

Elastomer P3 is obtained by hydrogenation of 77% of the double bonds in elastomer P.

Elastomer Q1 is obtained by hydrogenation of 51% of the double bonds in elastomer Q, which is richer in 1,4-butadiene units than elastomer P.

TABLE 1

|  | Elastomer | | | | | |
| --- | --- | --- | --- | --- | --- | --- |
|  | P | P1 | P2 | P3 | Q | Q1 |
| Diene unit (mol %)~Unit B + C | 85 | 43 | 22 | 14 | 81 | 29 |
| Degree of hydrogenation (%) | — | 41 | 65 | 77 | — | 51 |
| Styrene (mol %)~Unit F | 15 | 13 | 11 | 10 | 19 | 14 |
| 1,2-bond (mol %)~Unit C | 20 | 1 | 1 | — | 4 | — |
| 1,2 hydrogenated (mol %) Unit D | — | 16 | 14 | 14 | — | 3 |
| 1,4-bond (mol %)~Unit B | 65 | 42 | 21 | 14 | 77 | 29 |
| Ethylene unit (mol %)~Unit A | — | 28 | 53 | 62 | — | 54 |

The microstructure of the elastomers of the examples was determined in a known way by $^1$H NMR techniques. A "BRUKER AVANCE 500" spectrometer was used at a frequency of 500 MHz for the $^1$H NMR technique.

In Table 1, the term "degree of hydrogenation" is understood to mean the percentage of starting diene units hydrogenated.

Detailed Mode of Calculation to Obtain Elastomer P1 from Elastomer P:

The degree of hydrogenation corresponds to the number of diene units (B+C) hydrogenated; in elastomer P described above, there are 85 diene units out of 100 units. 65% of these 85 units are hydrogenated, which amounts to a number of units hydrogenated equal to 65×85/100≈55 units.

Hydrogenation of units C is favoured over that of units B and hydrogenation of 19 of the 20 diene units C which make up a polymer chain portion of 100 units is observed; they are converted into 19 units D.

To achieve a degree of hydrogenation of 65%, 36 diene units B are also hydrogenated (reminder: 55 diene units are hydrogenated per portion of 100 units). These 36 diene units are converted into 72 ethylene units A, and 29 diene units B, not affected by the hydrogenation, will remain.

Thus, after 65% hydrogenation of a chain portion of 100 units of the elastomer P, there are:

15 styrene units F (not affected by the hydrogenation)
19 units D obtained by hydrogenation of the units C
1 remaining diene unit C
36 hydrogenated 1,4-diene units or rather 72 ethylene units A
29 1,4-diene units B not affected.

For 100 starting units, therefore, there will be 136 final units. This is important for calculating the mol % of each unit. Thus:

15×100/136=11% styrene units F, 19×100/136=14% butadiene units D, 1×100/136=1% units C, 29×100/136=21% units B and 72×100/136=53% ethylene units A.

This mode of calculation may be applied to all the other elastomers in table 1.

Synthesis of the Highly Saturated Elastomers

All syntheses are carried out under an inert atmosphere using suitable equipment conditioned under nitrogen or argon (glove box, reactor, glassware) and according to techniques known to those skilled in the art (Schlenk techniques).

The solvents are purified beforehand so as to eliminate any traces of oxygen or moisture. The reagents come from conventional commercial sources (Sigma-Aldrich) and are used as they are.

Obtaining a Solution of Unsaturated Diene Elastomer in Methylcyclohexane.

The elastomer to be hydrogenated is dissolved in methylcyclohexane (MCH). The concentration by mass of elastomer is close to 5%.

Preparing a Tebbe-Type Reagent.

2.61 g of $Cp_2TiCl_2$ (TDC (titanocene dichloride) at 0.01 mol) and 84 ml of MCH are introduced into a 250 ml glass flask provided with an oxygen- and moisture-tight septum seal held by a metal cap.

20 ml of TMA (trimethylaluminium) at 1 mol/l in MCH are then added (0.02 mol). The resulting mixture is stirred for 72 hours at room temperature.

A dark blue solution is thus obtained, identified as Ti—Al having a titanium concentration of 0.1 mol/l.

Hydrogenation of the Unsaturated Diene Elastomer

One liter of MCH solution containing 40 grams of the elastomer to be hydrogenated is introduced into a 2 liter stainless steel reactor previously inertized with nitrogen. Volatile impurities are then eliminated by nitrogen bubbling over 3 minutes at room temperature. The polymer concentration is checked after this operation.

The solution is then heated to a temperature of 75° C., then 3 mmol of s-BuLi are added in the form of a 1 mol/l solution in MCH. The nitrogen is then degassed and a hydrogen pressure of 2 bar is applied. The mixture is stirred for 15 minutes and the temperature stabilized at 75° C. At this stage, 7.5 ml of the Ti—Al solution are added so as to generate the hydrogenation catalyst in situ by reacting the Ti—Al reagent with the LiH present in the reaction medium. The hydrogen pressure is maintained at 2 bar.

Recovery of the Highly Saturated Polymer

Hydrogen consumption is monitored over time and when the targeted amount is reached, which amount is linked to the targeted degree of hydrogenation, the supply of hydrogen is stopped and the medium is deactivated by degassing and adding a solution of diluted ethanol to the MCH. The resulting solution of partially hydrogenated diene polymer is evacuated, and the polymer is recovered by a stripping step followed by drying under partial vacuum (200 mbar) at 60° C. under nitrogen sparging for 48 hours.

Thus, around 40 mg of a highly saturated polymer are obtained.

The Compositions

Twelve compositions given in Table 2 below are compared. Three of said compositions are not in accordance with the formulation proposed by the invention:

Composition C1: control with unsaturated diene elastomer,
Composition C2: control with unsaturated diene elastomer, stiffened by increasing the amount of filler,
Composition C3: control with a blend of unsaturated diene elastomers.

The nine other compositions, M1 to M9, are in accordance with the invention and are based on the four highly saturated diene elastomers described in Table 1 and denoted P1, P2, P3 (since they are derived from the same diene elastomer), and Q1

The tests below are carried out in the following manner:

The diene elastomer(s), the reinforcing filler (carbon black) and also the various other ingredients with the exception of the vulcanization system, are introduced successively into an internal mixer (final fill ratio: around 70% by volume), the initial vessel temperature of which is around 80° C. Thermomechanical working (non-productive phase) is then carried out in a step which lasts in total around 3 to 4 minutes, until a maximum "dropping" temperature of 165° C. is reached. The mixture thus obtained is recovered and cooled and then sulphur and an accelerator of sulphenamide type are incorporated on a mixer (homofinisher) at 30° C., everything being mixed (productive phase) for a suitable time (for example around ten minutes).

The compositions thus obtained are subsequently calendered either in the form of plates (2 to 3 mm thickness) or thin sheets of rubber in order to measure the physical or mechanical properties thereof.

The compositions tested are given in Table 2 below, with
(1) Unsaturated elastomer P described above
(2) Natural rubber
(3) Highly saturated elastomer as prepared above
(4) Carbon black N347
(5) Phenol formaldehyde resin
(6) N-(1,3-dimethylbutyl)-N-phenylparaphenylenediamine
(7) 2,2,4-trimethyl-1,2-dihydroquinoline
(8) N-cyclohexyl-2-benzothiazyl sulphenamide
(9) Hexamethylene tetramine

TABLE 2

| | Composition | | | | | | | | | | | |
|---|---|---|---|---|---|---|---|---|---|---|---|---|
| | C1 | C2 | C3 | M1 | M2 | M3 | M4 | M5 | M6 | M7 | M8 | M9 |
| Unsaturated elastomer P (1) | 100 | 100 | 60 | | | | | | | | | |
| Unsaturated elastomer (2) | | | 40 | 40 | | 40 | 40 | 60 | | 40 | | 40 |
| Highly saturated elastomer (3) | | | | 60 (P1) | 100 (P2) | 60 (P2) | 60 (P2) | 40 (P2) | 100 (P3) | 60 (P3) | 100 (Q1) | 60 (Q1) |
| Filler (4) | 47.5 | 54 | 47.5 | 47.5 | 47.5 | 47.5 | 47.5 | 47.5 | 47.5 | 47.5 | 47.5 | 47.5 |
| Resin (5) | 0.5 | 0.5 | 0.5 | 0.5 | 0.5 | 0.5 | | 0.5 | 0.5 | 0.5 | 0.5 | 0.5 |
| Paraffin | 1 | 1 | 1 | 1 | 1 | 1 | 1 | 1 | 1 | 1 | 1 | 1 |
| 6-PPD (6) | 2 | 2 | 2 | 2 | 2 | 2 | 2 | 2 | 2 | 2 | 2 | 2 |
| TMQ (7) | 1 | 1 | 1 | 1 | 1 | 1 | 1 | 1 | 1 | 1 | 1 | 1 |
| ZnO | 3 | 3 | 3 | 3 | 3 | 3 | 3 | 3 | 3 | 3 | 3 | 3 |
| Stearic acid | 2.5 | 2.5 | 2.5 | 2.5 | 2.5 | 2.5 | 2.5 | 2.5 | 2.5 | 2.5 | 2.5 | 2.5 |
| CBS (8) | 0.6 | 0.6 | 0.6 | 0.6 | 0.6 | 0.6 | 0.6 | 0.6 | 0.6 | 0.6 | 0.6 | 0.6 |
| HMT3H (9) | 0.6 | 0.6 | 0.6 | 0.6 | 0.6 | 0.6 | 0.6 | 0.6 | 0.6 | 0.6 | 0.6 | 0.6 |
| Sulphur | 1.5 | 1.5 | 1.5 | 1.5 | 1.5 | 1.5 | 1.5 | 1.5 | 1.5 | 1.5 | 1.5 | 1.5 |

Results

The properties of the compositions are given in Table 3 below.

Figure 1:
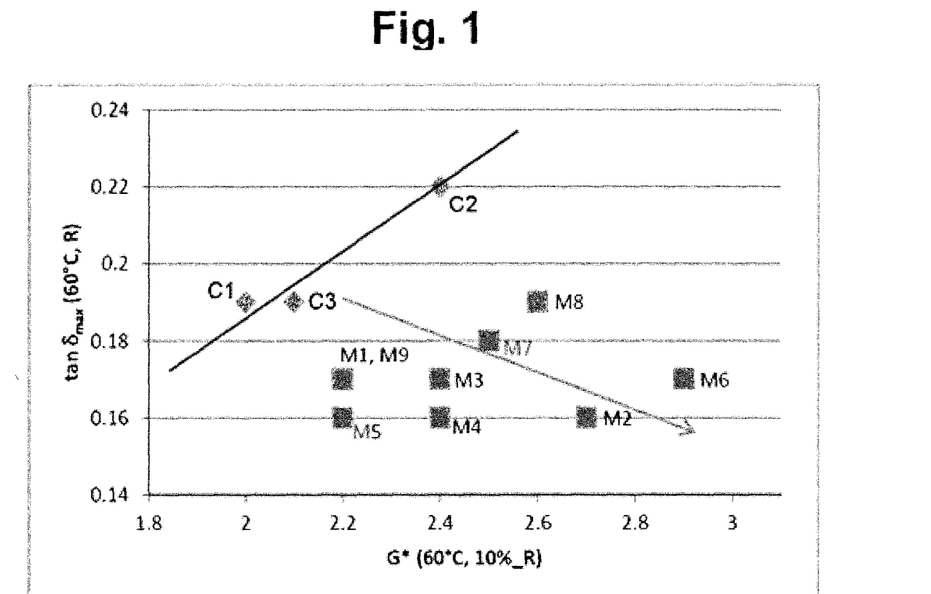
FIG. 1 is a graph showing results of tan dmax as a function of G*(10%) for compositions C1-C3, and M1-M9.
Figure 2:
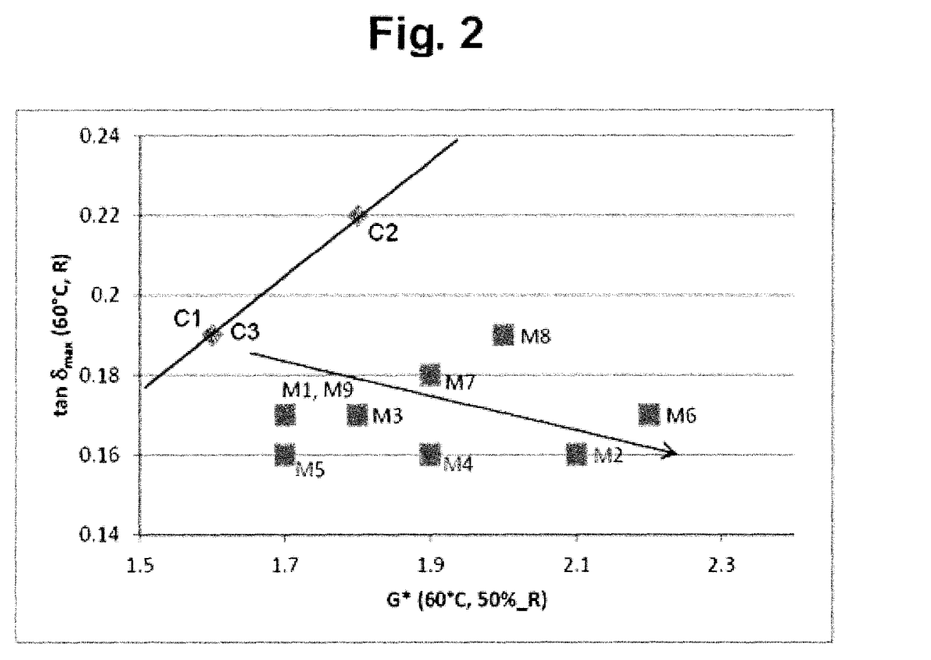
FIG. 2 is a graph showing results of tan dmax as a function of G*(50%) for compositions C1-C3, and M1-M9.

The results of tan $\delta_{max}$ as a function of G* are plotted on the graphs which are shown in FIG. 1 and FIG. 2. The graphs enable direct visualization of the compromise between stiffness and hysteresis properties which the present invention seeks to improve.

| | Composition | | | | | |
|---|---|---|---|---|---|---|
| | C1 | C2 | C3 | M1 | M2 | M3 |
| tan $\delta_{max}$ (60° C., 10 Hz) | 0.19 | 0.22 | 0.19 | 0.17 | 0.16 | 0.17 |

-continued

| | | | | | | |
|---|---|---|---|---|---|---|
| G* (MPa) (60° C., 10 Hz, 10%) | 2.0 | 2.4 | 2.1 | 2.2 | 2.7 | 2.4 |
| G* (MPa) (60° C., 10 Hz, 50%) | 1.6 | 1.8 | 1.6 | 1.7 | 2.1 | 1.8 |
| MA10 (60° C.) | 5.5 | 6.3 | 5.5 | 6.1 | 7.8 | 6.7 |
| MA100 (60° C.) | 2.1 | 2.5 | 2.3 | 2.8 | 3.6 | 2.9 |

| | Composition | | | | | |
|---|---|---|---|---|---|---|
| | M4 | M5 | M6 | M7 | M8 | M9 |
| tan $\delta_{max}$ (60° C., 10 Hz) | 0.16 | 0.16 | 0.17 | 0.18 | 0.19 | 0.17 |
| G* (MPa) (60° C., 10 Hz, 10%) | 2.4 | 2.2 | 2.9 | 2.5 | 2.6 | 2.2 |
| G* (MPa) (60° C., 10 Hz, 50%) | 1.9 | 1.7 | 2.2 | 1.9 | 2.0 | 1.8 |
| MA10 (60° C.) | 6.5 | 5.9 | 8.3 | 7.1 | 7.1 | 7.4 |
| MA100 (60° C.) | 2.9 | 2.9 | 3.6 | 2.9 | 3.0 | 3.0 |

It is noted that the stiffness at low and moderate strains, respectively 10 and 50% strain, of the compositions in accordance with an embodiment of the invention, is greater than that of control compositions C1 and C3, and close to, or even greater than, that of control composition C2 which has a greater amount of filler than control composition C1 with the aim of improving the stiffness. It is clearly observed that this increase in the amount of filler has an adverse effect on the hysteresis properties of control composition C2 in light of control composition C1.

This improvement in the mechanical properties is favourable in terms of the wear resistance of a tire equipped with a tread made of such a composition.

Despite this improvement in stiffness, the compositions in accordance with the invention have maintained or even improved hysteresis properties compared to those of the control compositions C1 and C3, contrary to what is observed for control composition C2.

This is favourable in order to reduce the rolling resistance of a tire equipped with a tread made of such a composition.

In conclusion, the results of these tests show that the use of a highly saturated diene elastomer affords a notable improvement in the stiffness of the rubber compositions according to the invention, and hence an improvement in the wear resistance of tires containing said compositions, while maintaining or even reducing the hysteresis of the compositions and hence the rolling resistance of the tires compared to a conventional tire.

Example 2

The example which follows shows that the improvement in stiffness of the rubber compositions, while maintaining the same degree of hysteresis and hence of rolling resistance or even improving the hysteresis by lowering the value thereof compared to the control compositions, applies to compositions for which the reinforcing filler is inorganic, siliceous in this case.

The Compositions

The compositions will consist of the same elastomers as in the preceding example described in Table 1.

Five compositions given in Table 4 below are compared. Two of said compositions are not in accordance with the formulation proposed by the invention:

Composition C1': control with unsaturated diene elastomer,

Composition C2': control with unsaturated diene elastomer, stiffened by increasing the amount of filler.

The three other compositions, M1' to M3', are in accordance with the invention and are based on the three different highly saturated diene elastomers P2, P3 and Q1.

The tests below are carried out in the following manner:

The diene elastomer(s), the reinforcing fillers (silica and carbon black) and also the various other ingredients with the exception of the vulcanization system, are introduced successively into an internal mixer (final fill ratio: around 70% by volume), the initial vessel temperature of which is around 90° C. Thermomechanical working (non-productive phase) is then carried out in a step which lasts in total around 3 to 4 minutes, until a maximum "dropping" temperature of 165° C. is reached. The mixture thus obtained is recovered and cooled and then sulphur and an accelerator of sulphenamide type are incorporated on a mixer (homofinisher) at 30° C., everything being mixed (productive phase) for a suitable time (for example around ten minutes).

The compositions thus obtained are subsequently calendered either in the form of plates (2 to 3 mm thickness) or thin sheets of rubber in order to measure the physical or mechanical properties thereof.

The compositions tested are given in Table 4 below, with

|  | Composition | | | | |
| --- | --- | --- | --- | --- | --- |
|  | C1' | C2' | M1' | M2' | M3' |
| Elastomer (1) | 100 | 100 | 100 | 100 | 100 |
|  | (P) | (Q) | (P2) | (P3) | (Q1) |
| Silica (2) | 90 | 110 | 90 | 90 | 90 |
| Carbon black (3) | 3 | 3 | 3 | 3 | 3 |
| Coupling agent (4) | 7.2 | 8.8 | 7.2 | 7.2 | 7.2 |
| Oil (5) | 7 | 13 | 7 | 7 | 10 |
| Resin (6) | 40 | 45 | 40 | 40 | 25 |
| Anti-ozone wax | 1.65 | 1.8 | 1.65 | 1.65 | 1.5 |
| 6PPD (7) | 2.4 | 2.65 | 2.4 | 2.4 | 1.9 |
| Stearic acid | 2 | 2 | 2 | 2 | 2 |
| DPG (8) | 1.8 | 1.8 | 1.8 | 1.8 | 1.7 |
| ZnO | 1.2 | 1.2 | 1.2 | 1.2 | 2.5 |
| CBS (9) | 2.3 | 2.3 | 2.3 | 2.3 | 1.8 |
| Sulphur | 1 | 1 | 1 | 1 | 1.4 |

(1) The elastomers used in the various compositions are described in Table 1 above
(2) 160 MP silica
(3) Carbon black N347
(4) TESPT "Si69"
(5) Oleic sunflower oil
(6) Polylimonene resin
(7) N-(1,3-dimethylbutyl)-N-phenylparaphenylenediamine
(8) Diphenylguanidine
(9) N-cyclohexyl-2-benzothiazyl sulphenamide Results The properties of the compositions are given in Table 5 below.

Figure 3:
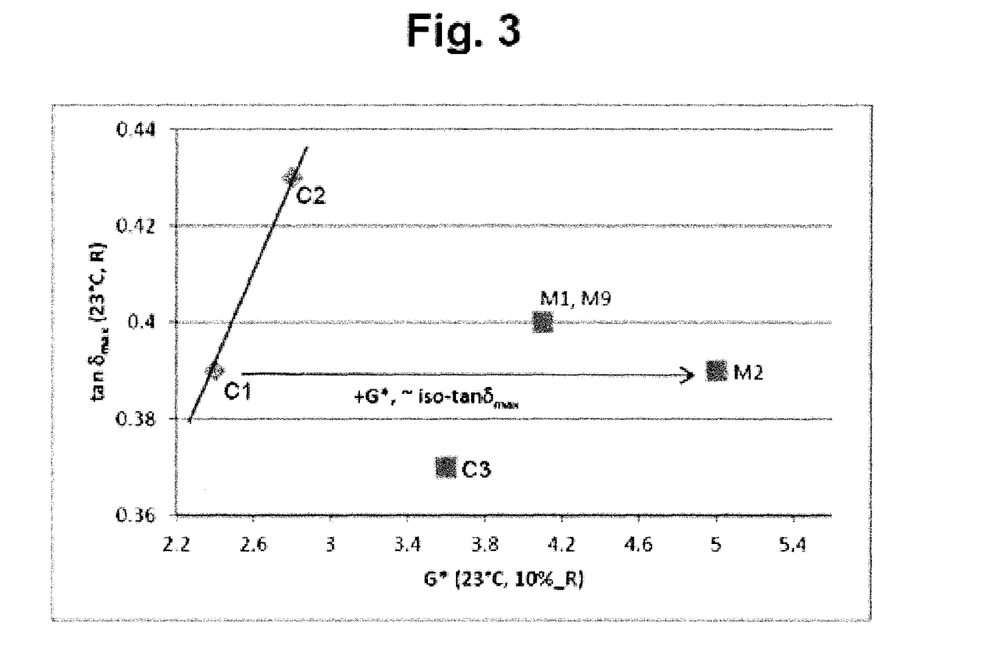
FIG. 3 is a graph showing results of tan dmax as a function of G*(10%) for compositions C1'-C3', and M1'-M3'.
Figure 4:
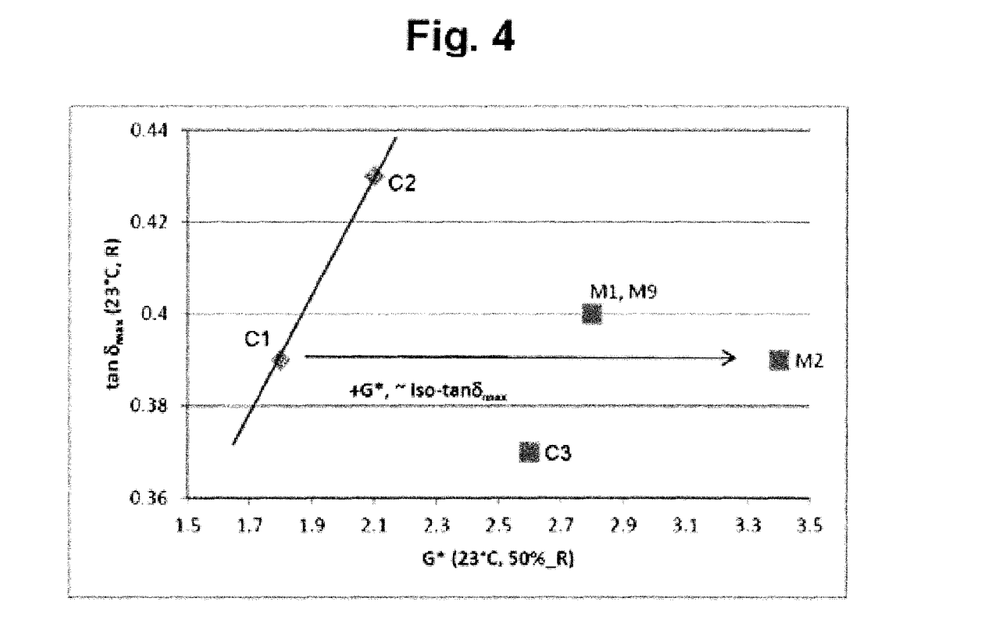
FIG. 4 is a graph showing results of tan dmax as a function of G*(50%) for compositions C1'-C3', and M1'-M3'.

The results of tan $\delta_{max}$ as a function of G* are plotted on the graphs which are shown in FIG. 3 and FIG. 4. As in Example 1, the graphs enable direct visualization of the compromise between stiffness and hysteresis properties which the present invention seeks to improve.

|  | Composition | | | | |
| --- | --- | --- | --- | --- | --- |
|  | C1' | C2' | M1' | M2' | M3' |
| tan $\delta_{max}$ (23° C., 10 Hz) | 0.39 | 0.43 | 0.37 | 0.40 | 0.39 |
| G* (MPa) (23° C., 10 Hz, 10%) | 2.4 | 2.8 | 3.6 | 4.1 | 5.0 |
| G* (MPa) (23° C., 10 Hz, 50%) | 1.8 | 2.1 | 2.6 | 2.8 | 3.4 |
| MA10 (23° C.) | 4.3 | 5.1 | 7.3 | 8.3 | 12.1 |
| MA100 (23° C.) | 1.6 | 1.7 | 2.8 | 2.5 | 3.5 |

As is the case for Example 1, the results of these tests show that the use of a highly saturated diene elastomer, here reinforced by an inorganic filler, affords a notable improvement in the stiffness of the rubber compositions according to the invention, and hence an improvement in the wear resistance of tires containing said compositions, while maintaining or even reducing the hysteresis of the compositions and hence the rolling resistance of the tires compared to a conventional tire.

The invention claimed is:

1. A rubber composition based on a reinforcing filler and on an elastomeric matrix comprising a diene elastomer, wherein the diene elastomer comprises, distributed randomly within the elastomer, units of the following categories A, B, C, D and E, or units of these same categories A, B, C, D and E comprising, for at least one of the categories B, C, D and E, a mixture of at least two different units of the same category which differ from one another through the nature of their side groups Ri:

A)

at a molar fraction of m %

B)

at a molar fraction of n %

C)

at a molar fraction of o %

-continued

D)

at a molar fraction of p %

E)

at a molar fraction of q % where
R1, R2, R3 and R4, which are identical or different, denote a hydrogen atom, a methyl radical or a phenyl radical which is substituted or unsubstituted in the ortho, meta or para position by a methyl radical,
R5 denotes a hydrogen atom or a methyl radical,
R6 denotes a methyl radical or a phenyl radical which is substituted or unsubstituted in the ortho, meta or para position by a methyl radical,
m, n, o, p and q are numbers ranging from 0 to 100; and wherein the elastomer has the following properties:
$m/p \geq 1.75$
$m \geq 50$
$n+o \geq 10$
$o+p \leq 15$.

2. Rubber The rubber composition according to claim 1, wherein the diene elastomer further comprises units of the following category F derived exclusively from non-diene monomers, at a molar ratio of less than 40%:

F)

with φ denoting a phenyl radical which is substituted or unsubstituted in the ortho, meta or para position by a methyl radical.

3. The rubber composition according to claim 1, wherein the diene elastomer is such that R1, R2, R3 and R4 are identical and denote a hydrogen atom, and q is equal to 0.

4. The rubber composition according to claim 1, wherein o is equal to 0.

5. The rubber composition according to any claim 1, wherein the elastomeric matrix consists solely of the highly saturated diene elastomer.

6. The rubber composition according to claim 1, wherein the elastomeric matrix comprises at least 40 phr of highly saturated diene elastomer and at most 60 phr of at least one other diene elastomer.

7. The rubber composition according to claim 1, wherein the reinforcing filler comprises carbon black.

8. The rubber composition according to claim 7, wherein the reinforcing filler consists of 100% of carbon black.

9. The rubber composition according to claim 1, wherein the reinforcing filler comprises an inorganic reinforcing filler other than carbon black.

10. A process for preparing a rubber composition as defined in claim 1, comprising: carrying out, at a maximum temperature of between 130° C. and 200° C., a first step of thermomechanical working of the base constituents needed for the rubber composition, with the exception of the crosslinking system and if applicable an adhesion promoter, by intimately incorporating, by kneading in one or several stages, composition ingredients into the elastomeric matrix comprising the highly saturated elastomer, then carrying out, at a temperature lower than said maximum temperature of said first step, a second step of mechanical working during which said crosslinking system and if applicable an adhesion promoter are incorporated.

11. The process according to claim 10, further comprising preparing the highly saturated elastomer, by hydrogenating a diene elastomer until the microstructural properties as defined in claim 1 are obtained.

12. A semi-finished article comprising a rubber composition as defined in claim 1.

13. A tire incorporating a semi-finished article according to claim 12.

14. The tire according to claim 13, wherein the semi-finished article is a tread.

15. The rubber composition according to claim 2, wherein φ denotes a phenyl radical.

16. The rubber composition according to claim 9, wherein the inorganic reinforcing filler is silica.

17. The process according to claim 10, wherein the maximum temperature is between 145° C. and 185° C.

18. The process according to claim 10, wherein temperature lower than said maximum temperature of said first step is lower than 120° C.

* * * * *